US012777083B2

(12) United States Patent
Papakostas et al.

(10) Patent No.: US 12,777,083 B2
(45) Date of Patent: Oct. 27, 2026

(54) USE OF ON-DEVICE METER TO MONITOR STREAMING-MEDIA EXPOSURE

(71) Applicant: The Nielsen Company (US), LLC, New York, NY (US)

(72) Inventors: Achilleas Papakostas, Dallas, TX (US); John Steven Stavropoulos, Edison, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 56 days.

(21) Appl. No.: 19/029,379

(22) Filed: Jan. 17, 2025

(65) Prior Publication Data

US 2026/0189617 A1 Jul. 2, 2026

Related U.S. Application Data

(60) Provisional application No. 63/740,781, filed on Dec. 31, 2024.

(51) Int. Cl.

| | |
|---|---|
| ***H04L 65/60*** | (2022.01) |
| ***H04L 43/0894*** | (2022.01) |
| ***H04N 21/258*** | (2011.01) |
| ***H04N 21/439*** | (2011.01) |
| ***H04N 21/442*** | (2011.01) |

(52) U.S. Cl.

CPC .......... *H04L 65/60* (2013.01); *H04L 43/0894* (2013.01); *H04N 21/25883* (2013.01); *H04N 21/4394* (2013.01); *H04N 21/44204* (2013.01)

(58) Field of Classification Search

CPC . H04L 43/0894; H04L 65/60; H04N 21/4394; H04N 21/44204; H04N 21/25883

See application file for complete search history.

(56) References Cited

U.S. PATENT DOCUMENTS

| | | | | |
|---|---|---|---|---|
| 2013/0251189 | A1* | 9/2013 | McMillan | H04H 20/14 382/100 |
| 2017/0041668 | A1* | 2/2017 | Fisch | H04N 21/25883 |
| 2017/0245009 | A1* | 8/2017 | Nielsen | H04N 21/4394 |
| 2025/0119615 | A1* | 4/2025 | Petro | H04N 21/44204 |
| 2025/0166018 | A1* | 5/2025 | Woodruff, III | H04L 43/0894 |

* cited by examiner

*Primary Examiner* — Barbara B Anyan

(74) *Attorney, Agent, or Firm* — McDonnell Boehnen Hulbert & Berghoff LLP

(57) ABSTRACT

A method and system to facilitate media measurement when a device engages in streaming media communication that bypasses a possible local-area-network based streaming meter. An example method includes the device engaging in packet-data communications through a cellular-wireless connection between the device and a cellular access node. Further, the method includes he device routing the packet-data communications through an on-device meter programmatically defined within the device. Still further, the method includes the device using the on-device meter to detect, based on the packet-data communications, at least one streaming-media event including (i) a domain event associated with a streaming-media source and (ii) a bandwidth event associated with the domain event. And the method includes the device reporting the at least one detected streaming-media event to a media-measurement platform.

20 Claims, 6 Drawing Sheets

USE OF ON-DEVICE METER TO MONITOR STREAMING-MEDIA EXPOSURE

REFERENCE TO RELATED APPLICATION

This application claims priority to U.S. Provisional Patent Application No. 63/740,781, filed Dec. 31, 2024, the entirety of which is hereby incorporated by reference.

SUMMARY

In order to measure the extent to which people of various demographics engage with and/or are otherwise exposed to media content (e.g., linear broadcast content, streaming media content, websites, applications, etc.), a media-measurement company can arrange to have monitoring devices or "meters" operate in representative households or other sites. People who have their media exposure monitored may be considered "panelists," and the places where the monitoring occurs, such as home, offices, or other premises, may be considered "panelist sites." Panelists may opt into and thus consent to this monitoring.

Meters can take various forms, including for instance (i) "presentation meters," which may be configured to monitor presentation or playing of media by media-presentation devices such as televisions, computers, tablets, phones, gaming devices, smart speakers, radios, streaming-media players, set top boxes, and audio-visual receivers, and (ii) "streaming meters" (i.e., network-traffic meters), which may be configured to monitor network traffic such as but not limited to streaming-media-related traffic and web browsing traffic.

At each of various panelist sites having a media-presentation device, for example, the media-measurement company may arrange for a presentation meter to monitor media presentation by that device and to generate query signature data representing the presented media. Further, the media-measurement company may operate a back-end, cloud-based computing system, to receive and evaluate this presentation-meter-generated query signature data, in order to identify the media presented at the panelist site and thereby to establish associated media-exposure data.

By evaluating an audio line feed into the media-presentation device and/or by evaluating associated acoustic speaker output, a representative presentation meter at a panelist site may be configured to detect and extract watermarked identification codes from the audio and/or to generate digital audio fingerprint data representing component features of the audio, and to report the identification codes and/or fingerprint data, along with associated timestamps, as query signature data to the computing system for analysis. Such a presentation meter may also be configured to detect the power on or off state of the media-presentation device, so that the presentation meter can limit its media-presentation monitoring to times when the media-presentation device is on and therefore likely presenting media content being delivered to the media-presentation device.

The back-end computing system may then be configured to refer to reference signature data that maps various identification codes and/or fingerprint data to known media content items, in order to determine, based on the presentation-meter-reported identification codes and/or fingerprint data, what media content the media-presentation device was presenting at the indicated time. In particular, the computing system may be configured to search through the reference signature data in an effort to find reference signature data that matches the reported query signature data and, upon finding a match with sufficient certainty, to conclude that media content represented by the query signature data is the media associated with the matching reference signature data, and to establish associated media-presentation records for the panelist site, thus crediting the identified media content as being presented at the panelist site (e.g., as panelist-credited content).

Further, the computing system may be configured to correlate these media-presentation records with pre-stored demographics of the panelist and/or panelist site at issue, in order to establish associated media-exposure data, and the computing system may be configured to use this media-exposure data from multiple panelist sites as a basis to establish ratings statistics that may facilitate commercial processes such as ad placement and other content delivery.

In addition, at each of various panelist sites having a local area network (LAN) or otherwise supporting packet-based network communication or the like, the media-measurement company may arrange for a streaming meter to monitor and report to the back-end system information about network traffic at the panelist site. Without limitation, this network traffic may include streaming-media-related traffic such as streaming-media control communications and ongoing streaming-media sessions.

Monitoring streaming-media-related traffic in particular may help to facilitate media measurement (e.g., audience measurement) related to media streaming from Over The Top (OTT) streaming-media service providers or the like.

For instance, when query signature data provided by a presentation meter matches reference signature data representing non-linear streaming-media content and the computing system therefore credits that streaming-media content as having been presented at the panelist site, it may also be useful for the computing system to identify the source of that streaming-media content. Including this source information as part of the media-exposure data may enhance the data and associated ratings statistics and may facilitate useful action keyed to the source. For example, knowledge that panelists (e.g., of particular demographics) have been exposed to content provided by a particular OTT service provider may support a decision to arrange for that OTT service provider to distribute particular ads and/or other content, among other possibilities.

Further, even regardless of what particular streaming-media content the panelist site was receiving at the time, it may be useful for the computing system to determine that the panelist site was receiving streaming media from a particular OTT service provider. That information, in conjunction with panelist demographics information and/or other information, may similarly support decisions to arrange for the OTT service provider to distribute particular ads and/or other content, among other possibilities.

To facilitate monitoring network traffic at a panelist site, it would be useful to situate the streaming meter within a network communication path through which traffic of interest would flow, so that the streaming meter would have a view of that traffic. In an example implementation, the traffic of interest may include packet-based internet communications to and/or from a given media-presentation device (such as one of those noted above) or other host device at the panelist site. Therefore, it may be useful to situate the streaming meter within a network communication path through which those packet-based communications would flow at the panelist site.

If a representative host sits as a node on a panelist-site LAN and engages in internet communications through that LAN, one way to situate the streaming meter in that host's network communication path would be to similarly provide the streaming meter as node on the panelist-site LAN and to have the host's internet traffic flow through that streaming meter node. In practice, the streaming meter could be provided as a dedicated streaming-meter device connected as a node on the LAN or could be embedded as software or the like in another device that is connected as a node on the LAN. Further, in some implementations, the streaming meter could be integrated with a presentation meter, as a single device for instance, situated to both monitor media presentation and monitor network traffic.

The streaming meter may then monitor network traffic flowing to and/or from the host device and may report associated information to the back-end system, to enable the back-end system to factor that information into its analysis and associated operations. With this information, for instance, the back-end system may be able to identify times when a host device at the panelist site was receiving streaming media, and the back-end system may be able to determine the source of that streaming media, which may facilitate useful associated operations as discussed above. Further, with this information, the back-end system may be able to establish other media-exposure data related to websites visited, online games played, and/or other network services used, among other possibilities.

While such a streaming meter may work well to monitor network traffic at a panelist site, a technical issue with that arrangement is that it would require the network traffic to flow through the streaming meter so that the streaming meter can have a view of the traffic and can thereby report associated network-traffic information to the back-end system. This may work well if the network traffic flows over a panelist-site LAN, e.g., through Wi-Fi and/or Ethernet communications on the LAN, and if the streaming meter operates as a node on the LAN and has a view of the traffic. Unfortunately, however, this may not work for network traffic that flows instead over a cellular wireless connection or otherwise without traversing a LAN where the streaming meter would have a view of traffic.

With advances in cellular-wireless technologies, such as the widespread adoption of 5G New Radio (5G NR) and beyond, high speed cellular data rates have made the delivery and consumption of high resolution media, such as streaming video, over cellular possible. When a panelist at a panelist site (e.g., a member of a household who has opted in to having their media consumption monitored) or elsewhere receives streaming media on their smartphone directly over a cellular connection, that network traffic may bypass a LAN at the panelist site, and so a streaming meter operating on that LAN would have no view of that network traffic. As a result, the audience-measurement company may not receive valuable media-exposure data, which may adversely impact resulting analysis and operations.

The present disclosure provides a technical mechanism to help overcome this issue. In accordance with the disclosure, a panelist's cellular wireless device (e.g., smartphone) will be equipped with an on-device meter (ODM) that is configured to function as an intermediary in the device's network communications. For instance, the ODM may implement a lightweight virtual private network (VPN) through which packet-based network traffic to and/or from the device may flow. Further, the ODM may be configured to monitor and report to the back-end system information about network traffic, including traffic of the type noted above for instance, that flows to and/or from the panelist's device.

Use of an ODM meter as an intermediary in the device's network traffic may thereby facilitate monitoring and reporting to the back-end system of information about the device's network traffic without a need for the traffic to flow through an external streaming meter. This arrangement may therefore usefully facilitate monitoring and reporting information about the device's network communications in a situation where the device engages in the communications directly through a cellular-wireless connection rather than through a LAN where a streaming meter may operate. Further, use of the ODM may facilitate capturing relevant network-traffic information fully on the panelist's device without a need for use of any external streaming meter, external VPN server, or the like, which may help to preserve privacy of the network traffic.

Accordingly, in one respect, disclosed is an example method. The method includes a device engaging in packet-data communications through a cellular-wireless connection between the device and a cellular access node. Further, the method includes the device routing the packet-data communications through an ODM programmatically defined within the device. Still further, the method includes the device using the ODM to detect, based on the packet-data communications, at least one streaming-media event including (i) a domain event associated with a streaming-media source and (ii) a bandwidth event associated with the domain event. And the method includes the device reporting the at least one detected streaming-media event to a media-measurement platform.

In yet another respect, disclosed is a device including a cellular-wireless communication interface, at least one processor, non-transitory data storage, and program instructions stored in the non-transitory data storage and executable by the at least one processor to cause the device to carry out operations such as those in the example method for instance.

Still further, in another respect, disclosed is non-transitory data storage (e.g., one or more instances of computer-readable memory and/or other storage) having stored program instructions executable by at least one processor of a device to cause the device to carry out operations such as those in the example method for instance.

Yet further, in still another respect, disclosed is a computer program comprising program instructions executable by at least one processor of a device to carry out operations such as those in the example method for instance.

In addition, in another respect, disclosed is a system including various means for carrying out operations such as those in the example method for instance.

These, as well as other embodiments, aspects, advantages, and alternatives, will become apparent to those of ordinary skill in the art by reading the following detailed description, with reference where appropriate to the accompanying drawings. Further, it should be understood that the disclosure provided in this summary and elsewhere in this document is provided by way of example only and that numerous variations and other examples may be possible as well.

DETAILED DESCRIPTION

The present disclosure will discuss example implementation in relation to a panelist's device comprising a smartphone that is equipped to engage in cellular-wireless communication and perhaps also Wi-Fi communication on a LAN of a panelist site. In practice, the panelist may use this smartphone's cellular-wireless communication to receive streaming media from OTT service providers and may consume (e.g., watch and/or listen to) the incoming media on the smartphone. As a result, even if the panelist is at the panelist site and the panelist site has a streaming meter configured to detect and report LAN-based streaming-media events, the streaming meter would have no view of the streaming-media-related communications. An ODM on the smartphone, however, may usefully operate to detect and report streaming-media events.

It will be understood, however, that the disclosed principles could apply as well in other contexts. For instance, the principles could apply with respect to any of various other types of devices, such as a wearable device, a tablet computer, a laptop, a dedicated streaming-media player, a gaming device, or other device that is similarly equipped to engage in cellular-wireless-based packet-data communications, thus possibly bypassing a panelist-site streaming meter or the like. Further, the principles could apply as well in a scenario where the device is equipped to engage in packet-data communications through another type of connection or channel that would prevent a LAN-based streaming meter from having a view of the network traffic. For instance, the principles could just as well apply in a scenario where a panelist-site LAN has a streaming meter and where the device operates on that LAN but has a VPN connection with a remote VPN server, thereby preventing the LAN-based streaming meter from seeing anything but encrypted communications flowing between the device and the VPN server. Other examples are possible as well.

In addition, it will be understood that arrangements and processes disclosed herein could take various other forms. For instance, elements and operations could be re-ordered, distributed, replicated, combined, omitted, added, or otherwise modified. Further, elements described as functional entities could be implemented as discrete or distributed components or in conjunction with other components/modules, and in any suitable combination and location. Still further, various operations described as being carried out by one or more entities could be implemented by and/or on behalf of those entities, through hardware, firmware, and/or software, such as by one or more processing units executing program instructions stored in memory, among other possibilities.

Figure 1:
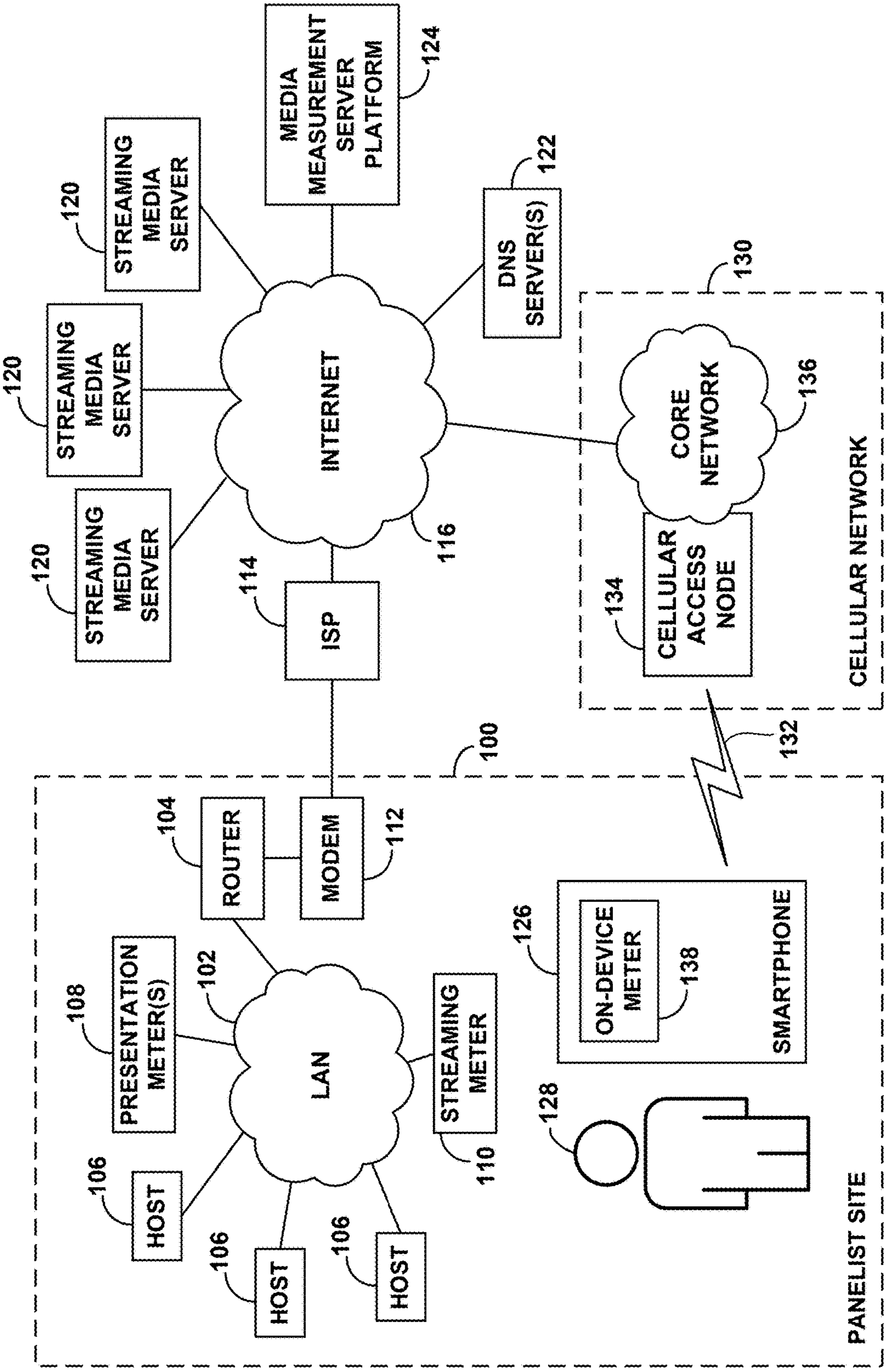
FIG. 1 is a simplified block diagram of an example arrangement in which disclosed features could be implemented.

Referring to the drawings, as noted above, FIG. 1 is a simplified diagram of an example arrangement in which various disclosed features could be implemented. In particular, FIG. 1 depicts at a panelist site (e.g., home, office, etc.) 100 an example packet-switched LAN 102 having a number of LAN nodes including but not limited to a router 104, one or more hosts of interest (e.g., media presentation devices) 106, one or more presentation meters 108, and an example streaming meter 110. These nodes may be connected to the LAN through wired (e.g., Ethernet) and/or wireless (e.g., Wi-Fi) links. Further, as noted above, the streaming meter 110 could be provided as a separate device or alternatively as logic within another device, possibly integrated with a presentation meter 108 for instance.

As shown, the router 104 is connected with a modem 112, which provides connectivity with an internet service provider (ISP) 114, to facilitate communication on the internet 116. Alternatively, the router 104 may be integrated with the modem 112.

Shown accessible through the internet 116 (e.g., at particular public IP addresses on the internet) are then multiple network resources such as streaming-media servers 120 and one or more Domain Name System (DNS) servers 122. Further, also shown accessible through the internet 116 is a media-measurement server platform 124, which may be operated by an example media-measurement company.

In practice, the streaming meter 110 may have a view of packet-data communications flowing to and/or from the one or more hosts 106 on the LAN 102, so that the streaming meter 110 can detect streaming-media events such as control communication between a host 106 and a streaming-media server 120 and high-bandwidth packet-data flow indicative or at least suggestive of a host receiving streaming-media. For instance, as described by U.S. patent application Ser. No. 18/824,108, filed Sep. 4, 2024 (the entirety of which is hereby incorporated by reference), each host 116 when connected with the LAN 102 may be set to route its packet-data communications through the streaming meter 110, so that streaming-media-related communications to/from the host 116 may flow through the streaming meter 110, and the streaming meter 110 may therefore detect those communications and accordingly report streaming-media events to the media-measurement server platform 124.

Without limitation, example streaming-media events that the streaming meter 110 may detect may include a domain event and a bandwidth event, separately and/or in combination. Having a view of network traffic on the LAN 102, the streaming meter 110 may detect these or other streaming-media events based on packet-data communications to and/or from the host 116.

A representative domain event may be where the host 116 engages in packet-data communication with a particular internet domain of or associated with a streaming-media server 120, such as packet-based communication to set up and/or control a streaming-media session from the server 120, among other possibilities. The streaming meter 110 may be able to detect such a domain event by detecting transmission from the host 116 of a DNS query that seeks to convert a domain name of such a streaming-media server (or associated server) to an IP address, to facilitate packet-data communication with that server. Alternatively or additionally, the streaming meter 110 may be able to detect such a domain event by detecting Hypertext Transfer Protocol (HTTP) or other-protocol messaging flowing between the host 116 and the domain or IP address of the streaming-media server 120.

A representative bandwidth event may be where the host 116 receives packet-data flow that has a pattern of streaming, i.e., a pattern of packet-data flow that is suggestive of the host 116 receiving streaming media transmission. This pattern of streaming could be defined in various ways, and the streaming meter 110 may thus monitor for and detect a pattern of streaming in various ways. By way of example, the streaming meter may monitor packet-data flow (e.g., on a per-domain basis, such as on a per source-IP-address basis) in short periods (e.g., 3, 5, 10, or 12 second periods) and may detect the presence of a pattern of streaming at times when (i) there is at least a predefined threshold number (e.g., 5, 6, 7, or 8) such periods of data contiguously from the same domain as each other, (ii) at least one of the threshold number of periods has at least a threshold high peak data rate (e.g., 30 kilobytes per second, 50 kilobytes per second, 100 kilobytes per second, or 1,000 kilobytes per second), and (iii) the minimum average data rate over the course of the detected periods is at least a predefined threshold high data rate (e.g., at least 10 kilobytes per second, at least 30 kilobytes per second, at least 100 kilobytes per second, or at least 1,000 kilobytes per second).

As the streaming meter 110 detects these or other streaming-media events, the streaming meter 110 may record the events along with associated timestamps, for reporting to the media-measurement platform 124. The streaming meter 110 may then report these detected events either in real time or periodically, such as every hour, every day, or the like, to facilitate processing by the platform 124.

Continuing with reference to FIG. 1, further shown in the panelist site 100 is an example smartphone 126 operated by an example panelist 128. As shown, this smartphone 124 has cellular-wireless connectivity with a cellular-wireless network 130, which may be operated by a cellular service provider. More particularly, in the arrangement shown, the smartphone 126 has an established cellular air-interface connection 132 (e.g., a Radio Resource Control (RRC) connection over a physical air interface defined according to a cellular wireless protocol such as Long Term Evolution (LTE), 5G New Radio (5G NR), or the like) with a cellular access node 134, such as an evolved Node-B (eNB) or next generation Node-B (gNB) for instance. The cellular access node 134 then interfaces with a core network 136 (e.g., an Evolved Packet System (EPS) core, or a 5G Core (5GC)), which in turn provides connectivity with the internet 116.

With this example arrangement, even though the smartphone 126 is at the panelist site and may be capable of communicating on the LAN 102, the smartphone 126 may instead engage in internet communications through the smartphone's cellular-wireless connection 132, thus effectively bypassing the LAN 102. Further, these packet-data communications may comprise streaming-media-related communications like those noted above. For instance, by executing a media player application or other program logic, the smartphone 126 may engage in packet-data communications with a streaming-media server 120 (or an associated server), to set up and/or control a streaming media session provided by that server 120 and to receive and play streaming media for consumption by the panelist 128. Thus, the streaming meter 110 may have no view of these streaming-media-related communications.

To help ensure that the media-measurement platform 124 learns about this streaming media activity, in line with the discussion above, the smartphone 126 can usefully include an ODM 138, which can function as a streaming meter with respect to packet-data communications to/from the smartphone 126. For instance, this ODM 138 may operate as a streaming meter to detect streaming-media events such as the domain events and bandwidth events noted above, and to report the detected events to the media-measurement platform.

This ODM 138 may therefore help to overcome the technical issue with the streaming meter 110 having no view of the smartphone's network traffic when the smartphone 126 is set to communicate through the smartphone's cellular-wireless connection 132 rather than over the LAN 102. Further, the ODM 138 may also facilitate metering operations when the panelist 128 operates the smartphone 126 to receive and play streaming media when outside of the panelist site 100 and thus away from the LAN 102.

Figure 2:
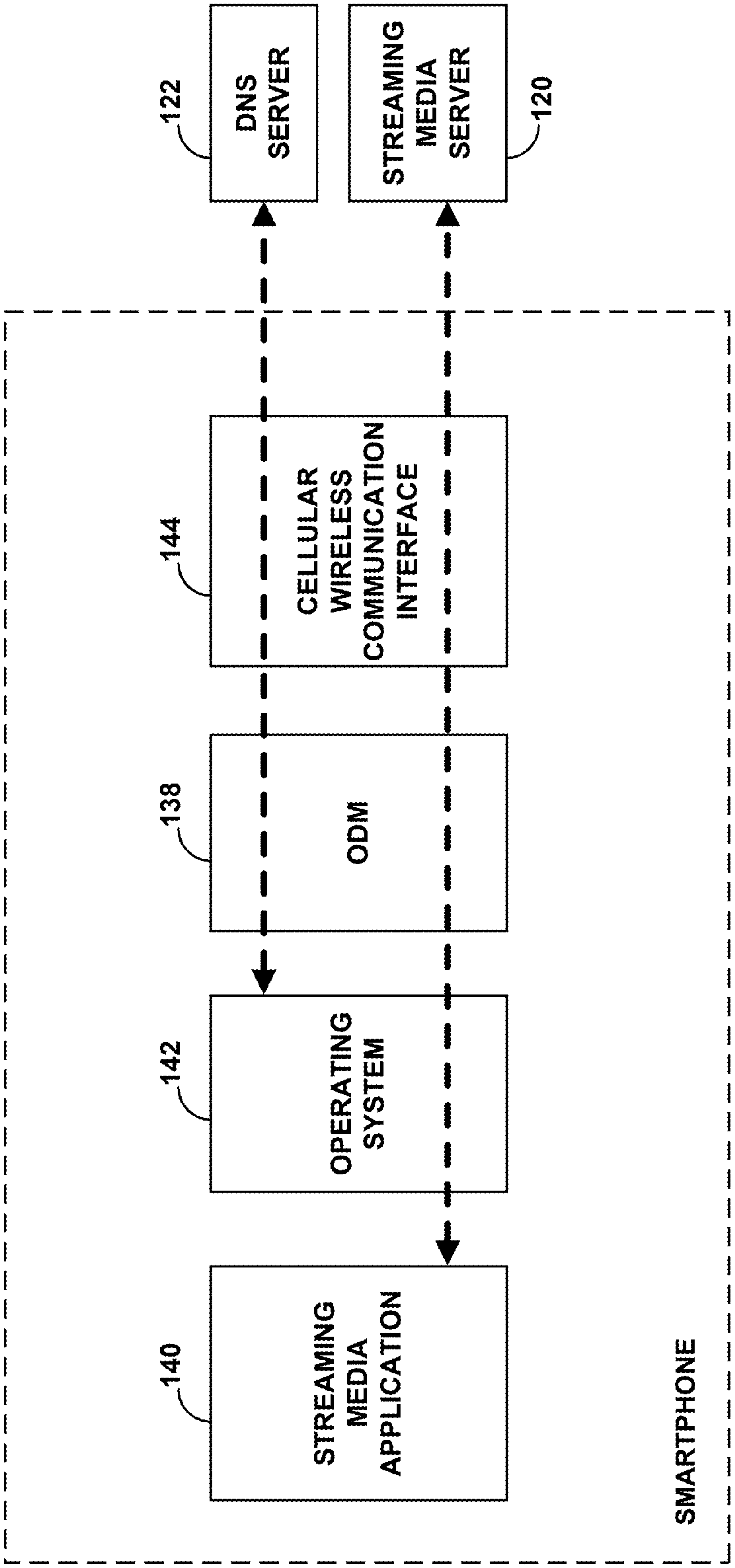
FIG. 2 illustrates how an on-device meter could be arranged to monitor for streaming-media events in an example implementation.

FIG. 2 illustrates generally how the ODM 138 in the smartphone 126 may operate as an example of an intermediary with respect to packet-data communications that flow to and/or from the smartphone 126. As shown in FIG. 2, the smartphone 126 may include a streaming-media application 140, an operating system 142, and a cellular wireless communication interface 144, and the ODM 138 may be situated logically between the operating system 142 and the cellular wireless communication interface 144.

With this arrangement, the application 140 may respond to input from the panelist 128 by working to initiate a streaming media session from an example streaming-media server 120. To do so, in an example implementation, the application 140 may generate and send to the operating system 142 an HTTP request carrying a destination Universal Resource Locator (URL) that specifies a domain name of the streaming-media server 120 (or an associated server) and that designates the particular media item to be streamed, among other possibilities. The operating system 142 may then resolve that domain name to an IP address by generating and transmitting an associated DNS query to a DNS server 122, via the cellular wireless communication interface 144 and connection 132. Further, the operating system 142 may process the HTTP request down a networking protocol stack, ultimately transmitting the request, also via the cellular wireless interface 144 and connection 132, to the server 120.

In some implementations, this HTTP request or other such packet-data communication may result in the streaming-media server 120 returning to the application 140 a manifest file that contains information about variants of the available stream, such as availability of segments at different bit rates, and that provides URLs respectively for the different segments. The application 140 may then sequentially send HTTP requests requesting desired segments of the media stream, which the operating system 142 may forward via the cellular wireless interface 144 and connection 132 for transmission to the server 120. Further, the server 120 may respond in real time to these sequential requests by streaming the segments of the stream to the smartphone, with this streaming media passing through the cellular wireless connection 132, interface 144, and operating system 142 to the application 140. And the application 140 may accordingly play out the media in real time for consumption by the panelist 128.

Note also that other protocols could be used for these or other streaming-media-related communications to and/or from the smartphone 126. For instance, rather than engaging in HTTP communication, the application 140 and/or operating system 142 may engage in secure HTTP Secure (HTTPS) communication, which may involve encrypted HTTP messages passing between the smartphone 126 and remote entities. Other protocols, such as streaming-specific protocols, may be used as well.

With the ODM 138 situated logically between the operating system 142 and the cellular wireless communication interface 144 or otherwise in the path of these packet-based communications, the ODM 138 can usefully have a view of packet-data communications flowing to and/or from the smartphone 126 and can therefore monitor those packet-data communications to detect streaming-media events. For instance, the ODM 138 could detect domain events such as DNS queries or other messaging that indicates the smartphone 126 is engaging or is about to engage in communication with a domain known to be associated with a particular streaming-media provider. And the ODM 138 could detect that packet-data flow being received by the smartphone 126 has pattern of streaming, possibly as defined above, among other possibilities.

Further, the ODM 138 could report these or other such detected events to the media-measurement platform 124 with associated timestamp information, also possibly via the cellular wireless interface 144 and connection 132, among other possibilities. Thus, the media-measurement platform 124 could receive this reporting of streaming-media events detected by the ODM 138 and can use this reporting as a basis to establish media-exposure data and associated ratings data, to facilitate useful operations as discussed above.

In an example implementation, in a scenario where the panelist site 100 includes the streaming meter 110 on the LAN 102, the ODM 138 may be arranged to carry out its monitoring and reporting of streaming-media events conditional on the smartphone 126 not being connected with the LAN 102.

For instance, the ODM 138 may be pre-provisioned with information identifying a Service Set Identifier (SSID) of a Wi-Fi access point on the LAN 102, and the ODM 138 may be configured to monitor when the smartphone 126 has Wi-Fi connectivity using that SSID. (To learn this, for example, the ODM 138 may subscribe to the operating system 142 to be informed when network connectivity of the smartphone 126 changes and, upon receiving an associated notification that the smartphone's connectivity has changed, may then request from the operating system 142 information about the smartphone's current network connection, which may indicate an SSID if the smartphone 126 is Wi-Fi connected or may indicate a mobile network identifier if the smartphone 126 is cellular-wireless connected, among other possibilities.)

Whenever the smartphone is not connected with the LAN 102 (e.g., responsive to the smartphone not being connected with the LAN 102), the ODM 138 may carry out the monitoring and reporting operations. Whereas, whenever the smartphone is connected with the LAN 102 (e.g., responsive to the smartphone being connected with the LAN 102), the ODM 138 may not carry out the monitoring and reporting operations.

On the other hand, in some implementations, the ODM 138 may carry out the monitoring, detecting, and recording of streaming-media event information while the smartphone 126 is cellular-wireless connected or otherwise not LAN connected, and the ODM 138 may the report that recorded streaming-media event information to the media-measurement platform via the LAN 102 when the smartphone 126 is later LAN connected, among other possibilities.

Furthermore, in some implementations, the ODM 138 may even operate when the smartphone 126 is connected with the LAN 102 (e.g., through a separate Wi-Fi communication interface of the smartphone 126). In that case, the smartphone's packet-data communications may flow through the LAN 102 rather than through the smartphone's cellular-wireless interface 144 and connection 132. As a result, both the ODM 138 in the smartphone 126 and the smart meter 110 on the LAN 102 may monitor and detect potentially the same streaming-media events in the smartphone's packet-data communications, and both the ODM 138 and the streaming meter 110 may report those streaming-media events to the media-measurement platform 124. In that situation, a computing system at the media-measurement platform may perform de-duplication.

In practice, for instance, the computing system at the media-measurement platform may correlate reported streaming-media events based on their timestamps, the host device at issue, and other properties and, in response to finding that a streaming-media event reported by the ODM 138 match a streaming-media event reported by the streaming meter, may delete one of those reported events to remove the duplication in processing of reported events.

Note also that it may be useful for ODM 138 to structure its reporting of streaming-media events in the same way that the streaming meter 110 reports streaming-media events, so as to facilitate deduplication when appropriate but also to enable the computing system at the media-measurement platform to factor into its media-exposure analysis non-duplicate records of streaming-media events reported by the ODM 138 and reported by the streaming meter 110.

As noted above, in an example implementation, the ODM 138 could be configured programmatically as a VPN server within the smartphone 126, and the smartphone 126 could be configured to operate as a VPN client routing its packet-data traffic through that VPN server. With this arrangement, the operating system 142 may be set to use this on-device VPN server, i.e., to route outbound packet-data communications through the VPN server, with responsive packet-data communications likewise flowing through the VPN server. The ODM 138 could thereby gain a view of the packet-data traffic that flows out from and in to the smartphone 126.

Figure 3:
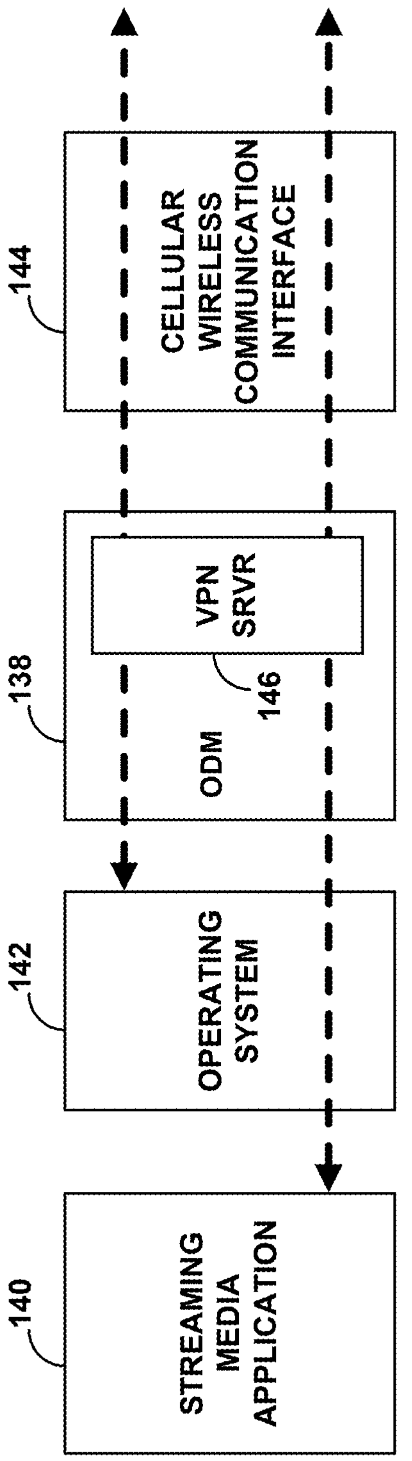
FIG. 3 illustrates how an on-device meter with a VPN could be arranged to monitor for streaming-media events in an example implementation.

FIG. 3 illustrates how this VPN arrangement can play out in an example implementation in the smartphone 126. As shown in FIG. 3, as in FIG. 2, the ODM 138 sits logically as an example intermediary between the operating system 142 and the wireless communication interface 144. Further, in this situation, the ODM 138 defines a VPN server 146, and the operating system 142 may be set to use the VPN server 146 as a VPN server for the smartphone's packet-data communications. Thus, outbound packet-data communications from the operating system may flow to the VPN server 146 for transmission, and the ODM 138 may in turn forward those communications, possibly again through the operating system 142, out via the wireless communication interface 144. Likewise, responsive or other incoming packet-data communications received by the wireless communication interface 144 may flow back through the VPN sever 146 to the operating system 142 and to additional logic such as the application 140 for processing. Note that this VPN server arrangement could work as well with respect to Wi-Fi or other communications by the smartphone 126.

In other arrangements, the ODM 138 could implement a proxy rather than a VPN server to facilitate similar routing of packet-data traffic through the ODM 138. Still other intermediary arrangements may be possible as well.

Figure 4:
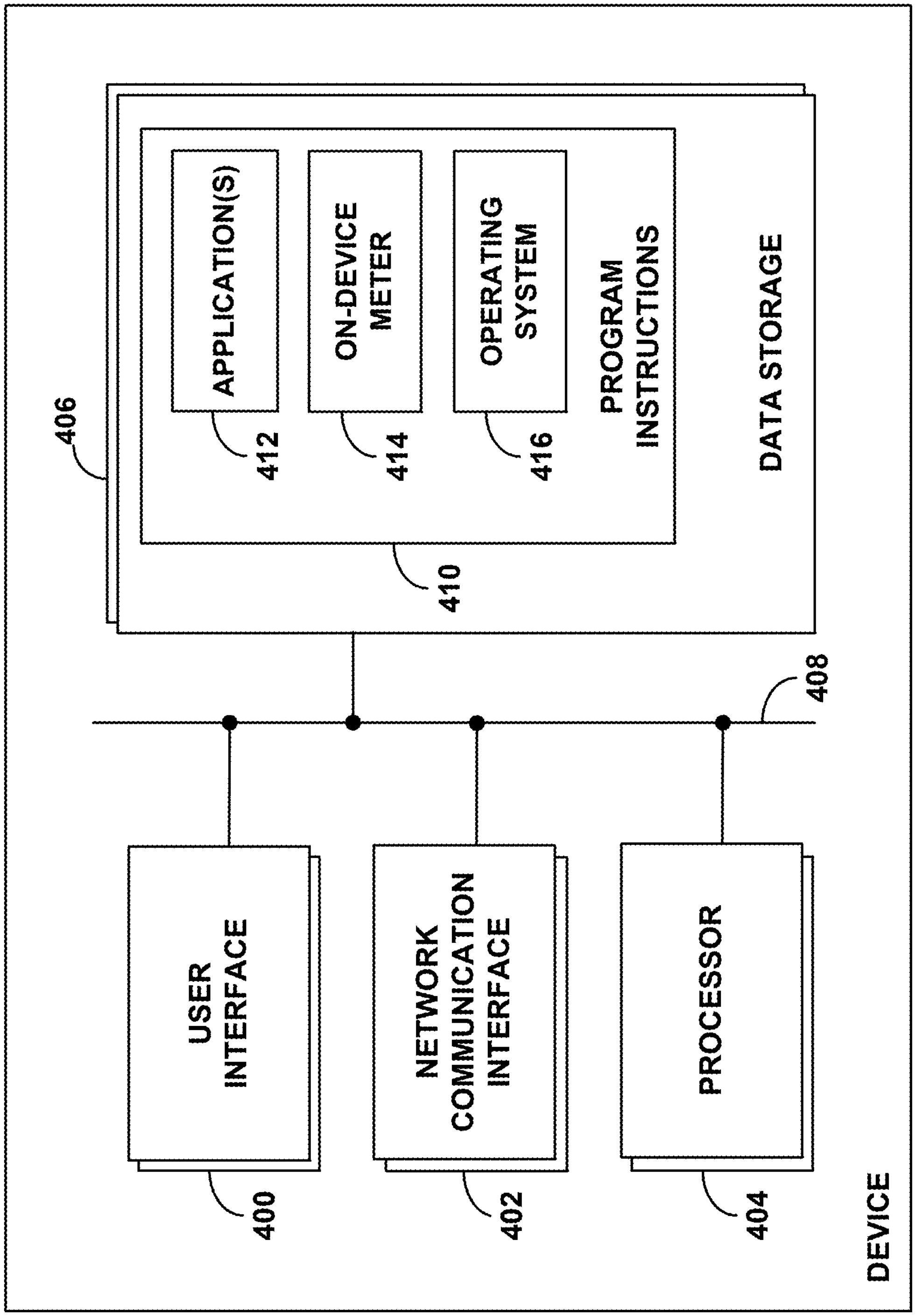
FIG. 4 is a simplified block diagram of an example device.

FIG. 4 is next a simplified block diagram of an example device such as the smartphone 126, that may be configured to carry out operations such as those discussed above. As shown in FIG. 4, the example device includes at least one user interface 400, at least one network communication interface 402, at least one processor 404, and non-transitory data storage 406, which could be integrated together in various ways and/or interconnected by a system bus, network, or other connection mechanism 408.

The at least one user interface 400 may comprise various components to facilitate interaction with a user of the device, such as with a panelist for instance. This may include output components such as a display and a sound speaker, and input components such as a touch-sensitive panel, a keyboard, and a microphone, which may work with associated drivers.

The at least one network communication interface 402 may comprise one or more interfaces facilitating communication with other devices, systems, and networks. For instance, the at least one network communication interface 402 may comprise a cellular wireless communication interface, a Wi-Fi communication interface, a Bluetooth communication interface, a wired Ethernet interface, and/or one or more other interfaces, which may work with associated drivers.

The at least one processor 404 may comprise one or more general purpose processors (e.g., microprocessors) and/or one or more specialized processors (e.g., digital signal processors (DSPs), graphics processing units (GPUs), neural processing units (NPUs), etc.) And the non-transitory data storage 406 may comprise one or more volatile and/or non-volatile storage components (e.g., flash, optical, magnetic, read only memory (ROM), random access memory (RAM) (e.g., dynamic RAM (DRAM), static RAM (SRAM), or double data rate RAM (DDRAM)), electronically programmable read only memory (EPROM), and/or electronically erasable programmable read only memory (EEPROM), etc.), which may be integrated in whole or in part with the processor 404 or may be provided separately.

As further shown, the non-transitory data storage 406 may store (e.g., hold or embody) program instructions 410. These program instructions may be executable by the processor 404 to cause the device to carry out various operations as described herein. As shown for instance, the instructions 410 may include applications 412, an on-device meter 414, and an operating system 416, any of which may also be integrated together as well or provided separately.

Figure 5:
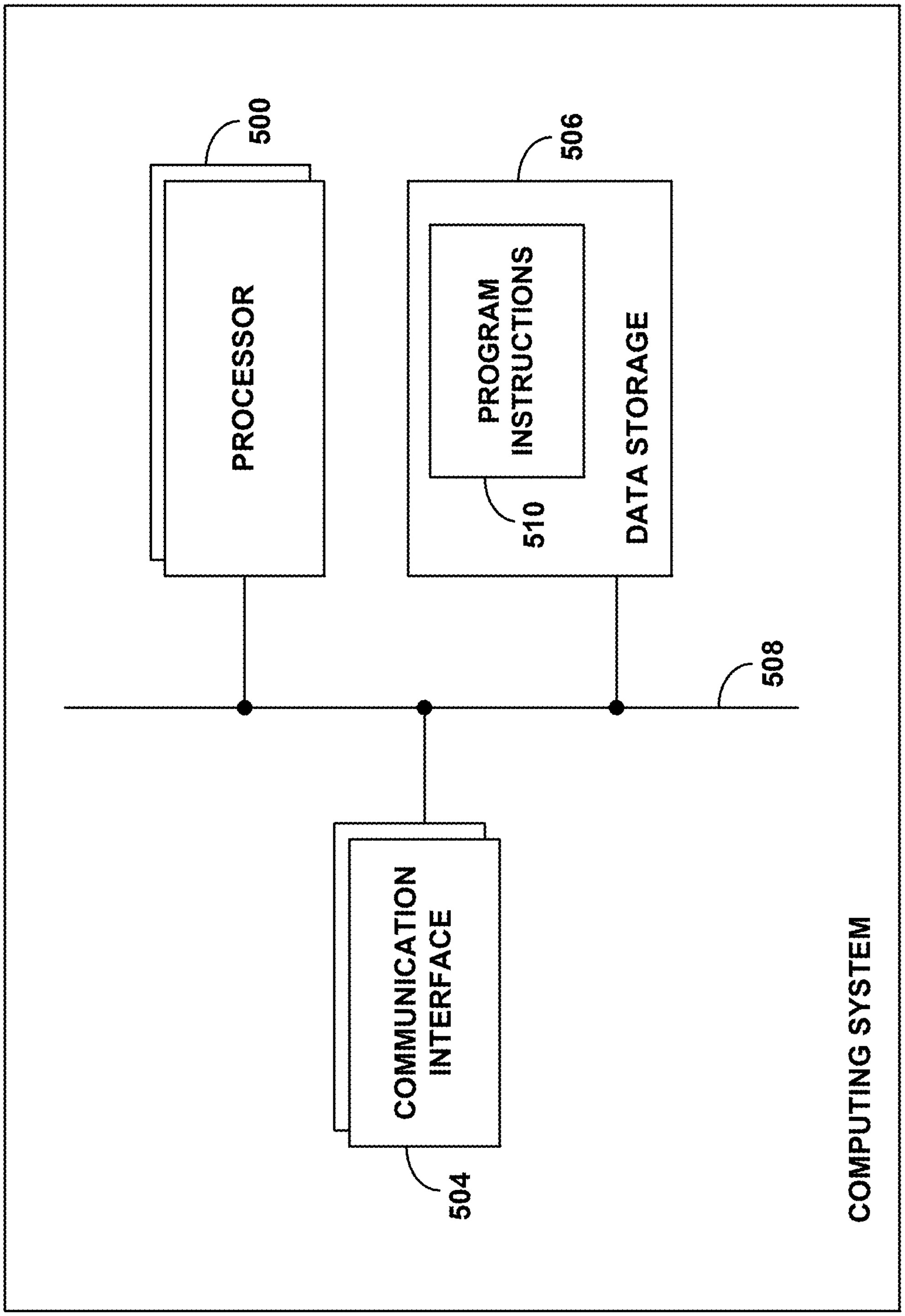
FIG. 5 is a simplified block diagram of an example computing system.

FIG. 5 is next a simplified block diagram of a computing system, which may represent a computing system of the media-measurement platform 124 and/or a computing system of one or more other devices and/or systems such as but not limited to those described herein.

As shown in FIG. 5, the example computing system includes at least one processor 500, at least one communication interface 502, and non-transitory data storage 504, any or all of which may be integrated together to various extents and/or communicatively linked with each other by a system bus, network, or other connection mechanism 506.

The at least one processor 500 may include one or more general purpose processors (e.g., microprocessors) and/or one or more specialized processors (e.g., DSPs, GPUs, NPUs, etc.) The at least one communication interface 502 may comprise a network communication interface, perhaps a wired and/or wireless communication module, among other possibilities, to facilitate communicating with other entities. And the non-transitory data storage 504 may include one or more volatile and/or non-volatile storage components (e.g., flash, optical, magnetic, ROM, RAM) (e.g., DRAM, SRAM, or DDRAM), EPROM, and/or EEPROM, etc.), which may be integrated in whole or in part with the processor 502 or may be provided separately. As further shown, the data storage 504 may store program instructions 508, which may be executable by the processor 502 to carry out various computing system operations.

Figure 6:
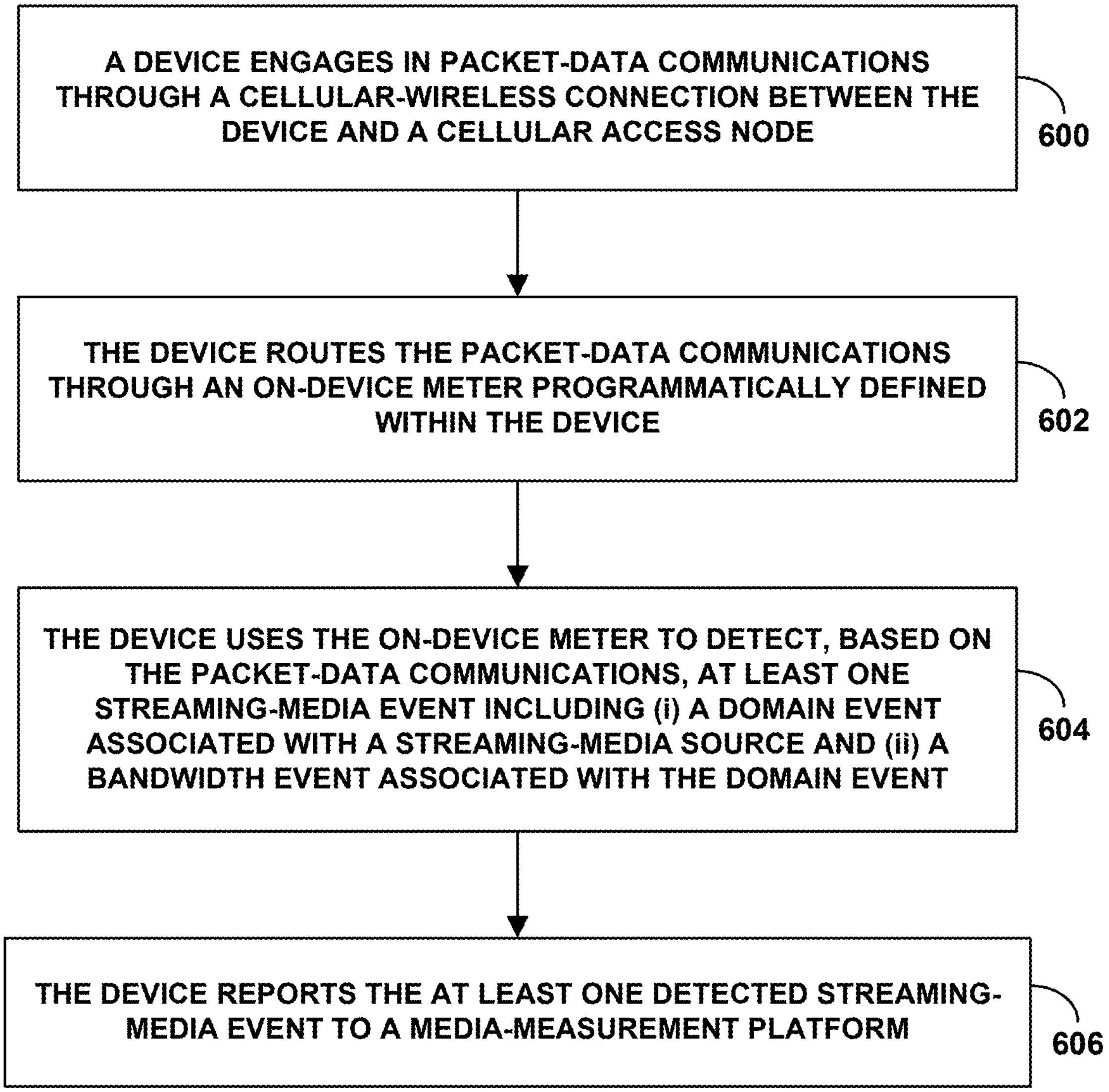
FIG. 6 is a flow chart illustrating an example method.

FIG. 6 is a flow chart illustrating an example computer-implemented method that may be carried out by an example device. As shown in FIG. 6, at block 600, the method includes the device engaging in packet-data communications through a cellular-wireless connection between the device and a cellular access node. At block 602, the method includes the device routing the packet-data communications through an on-device meter programmatically defined within the device. At block 604, the method includes the device using the on-device meter to detect, based on the packet-data communications, at least one streaming-media event including (i) a domain event associated with a streaming-media source and (ii) a bandwidth event associated with the domain event. And at block 606, the method includes the device reporting the at least one detected streaming-media event to a media-measurement platform.

In line with the discussion above, the domain event could comprise the device communicating with the streaming-media source, and the bandwidth event could comprise the device receiving a packet-data flow having a pattern of streaming. Further, as discussed above for instance, the pattern of streaming could comprise a data rate that is at least as high as a predefined threshold level indicative of streaming media. In addition, the method could also include making a timestamped record of the domain event and a timestamped record of the bandwidth event, in which case the act of the device reporting the at least one detected streaming-media event could involve the device reporting at least the timestamped record of the domain event and the timestamped record of the bandwidth event.

As further discussed above for instance, the device could be configured in various ways to route its packet-data communications through the on-device meter. One way to do so is to have the on-device meter comprise an on-device VPN server, with routing the packet-data communications through the on-device meter involving the device operating as a VPN client served by the on-device VPN so that the packet-data communications flow through the on-device meter.

As additionally discussed above for instance, the method could also include the device requiring, as a condition for using the meter to detect the at least one streaming-media event, that the device is not connected with a LAN at a panelist site or is otherwise not connected such that an external streaming meter can monitor the device's packet-data communications. Alternatively, the example method could be carried out by the device while the device is located at a panelist site that has a streaming meter configured to monitor for streaming-media events on a LAN of the panelist site.

As further discussed above for instance, the act of the device reporting the at least one detected streaming-media event to the media-measurement platform could occur via the device's cellular-wireless connection or alternatively through another channel.

The present disclosure also contemplates non-transitory data storage (e.g., one or more non-transitory computer-readable medium components (e.g., flash, optical, magnetic, ROM, RAM) (e.g., DRAM, SRAM, or DDRAM), EPROM, and/or EEPROM, and/or other computer-readable media, etc.)) holding program instructions executable by at least one processor of a device to cause a computing system to carry out various operations described herein.

Further, the present disclosure contemplates a computer program comprising a set of program instructions executable by at least one processor of a computing system to carry out (e.g., to cause the computing system to carry out) various operations described herein. In an example implementation, the computer program could further be stored in non-transitory data storage such as that noted above, among other possibilities.

Exemplary embodiments have been described above. Those skilled in the art will understand, however, that changes and modifications may be made to these embodiments without departing from the true scope and spirit of the invention.

What is claimed is:

1. A method comprising:

engaging by a device in packet-data communications through a cellular-wireless connection between the device and a cellular access node;

routing by the device the packet-data communications through an on-device meter programmatically defined within the device; and using by the device the on-device meter to detect, based on the packet-data communications, at least one streaming-media event including (i) a domain event associated with a streaming-media source and (ii) a bandwidth event associated with the domain event; and reporting by the device the at least one detected streaming-media event to a media-measurement platform.

2. The method of claim 1, wherein the domain event comprises the device communicating with the streaming-media source, and wherein the bandwidth event comprises the device receiving a packet-data flow having a pattern of streaming.

3. The method of claim 2, wherein the pattern of streaming comprises a data rate at least as high as a predefined threshold level indicative of streaming media.

4. The method of claim 2, further comprising making a timestamped record of the domain event and a timestamped record of the bandwidth event, and wherein reporting by the device the at least one detected streaming-media event comprises reporting by the device at least the timestamped record of the domain event and the timestamped record of the bandwidth event.

5. The method of claim 1, wherein the on-device meter comprises an on-device virtual-private-network (VPN) server, and wherein routing the packet-data communications through the on-device meter comprises operating by the device as a VPN client served by the on-device VPN so that the packet-data communications flow through the on-device meter.

6. The method of claim 1, further comprising requiring by the device, as a condition for using the meter to detect the at least one streaming-media event, that the device is not connected with a local area network (LAN) at a panelist site.

7. The method of claim 1, carried out by the device while the device is located at a panelist site that has a streaming meter configured to monitor for streaming-media events on a local area network (LAN) of the panelist site.

8. The method of claim 1, wherein reporting by the device the at least one detected streaming-media event to the media-measurement platform occurs via the cellular-wireless connection.

9. A device comprising:

a cellular-wireless communication interface;

at least one processor;

non-transitory data storage;

program instructions stored in the non-transitory data storage and executable by the at least one processor to cause the device to carry out operations including:

engaging in packet-data communications through a cellular-wireless connection between the cellular-wireless communication interface and a cellular access node, routing the packet-data communications through an on-device meter programmatically defined within the device, and using the on-device meter to detect, based on the packet-data communications, at least one streaming-media event including (i) a domain event associated with a streaming-media source and (ii) a bandwidth event associated with the domain event, and reporting the at least one detected streaming-media event to a media-measurement platform.

10. The device of claim 9, wherein the domain event comprises the device communicating with the streaming-media source, and wherein the bandwidth event comprises the device receiving a packet-data flow having a pattern of streaming.

11. The device of claim 10, wherein the pattern of streaming comprises a data rate at least as high as a predefined threshold level indicative of streaming media.

12. The device of claim 9, wherein the on-device meter comprises an on-device virtual-private-network (VPN) server, and wherein routing the packet-data communications through the on-device meter comprises operating as a VPN client served by the on-device VPN so that the packet-data communications flow through the on-device meter.

13. The device of claim 9, wherein the operations additionally include requiring, as a condition for using the meter to detect the at least one streaming-media event, that the device is not connected with a local area network (LAN) at a panelist site.

14. The device of claim 9, wherein reporting the at least one detected streaming-media event to the media-measurement platform occurs via the cellular-wireless connection.

15. Non-transitory computer-readable storage having stored thereon program instructions executable by at least one processor of a device to cause the device to carry out operations comprising:

engaging in packet-data communications through a cellular-wireless connection between the device and a cellular access node;

routing the packet-data communications through an on-device meter programmatically defined within the device; and using the on-device meter to detect, based on the packet-data communications, at least one streaming-media event including (i) a domain event associated with a streaming-media source and (ii) a bandwidth event associated with the domain event; and reporting the at least one detected streaming-media event to a media-measurement platform.

16. The non-transitory computer-readable storage of claim 15, wherein the domain event comprises the device communicating with the streaming-media source, and wherein the bandwidth event comprises the device receiving a packet-data flow having a pattern of streaming.

17. The non-transitory computer-readable storage of claim 16, wherein the pattern of streaming comprises a data rate at least as high as a predefined threshold level indicative of streaming media.

18. The non-transitory computer-readable storage of claim 15, wherein the on-device meter comprises an on-device virtual-private-network (VPN) server, and wherein routing the packet-data communications through the on-device meter comprises operating as a VPN client served by the on-device VPN so that the packet-data communications flow through the on-device meter.

19. The non-transitory computer-readable storage of claim 15, wherein the operations additionally include requiring, as a condition for using the meter to detect the at least one streaming-media event, that the device is not connected with a local area network (LAN) at a panelist site.

20. The non-transitory computer-readable storage of claim 15, wherein reporting the at least one detected streaming-media event to the media-measurement platform occurs via the cellular-wireless connection.

* * * * *